United States Patent
Pham

(10) Patent No.: US 9,459,118 B2
(45) Date of Patent: Oct. 4, 2016

(54) ADJUSTING STEP COUNT TO COMPENSATE FOR ARM SWING

(71) Applicant: Apple Inc., Cupertino, CA (US)

(72) Inventor: Hung A. Pham, Oakland, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 13/913,276

(22) Filed: Jun. 7, 2013

(65) Prior Publication Data
US 2014/0365169 A1 Dec. 11, 2014

(51) Int. Cl.
*G01C 22/00* (2006.01)

(52) U.S. Cl.
CPC .................... *G01C 22/006* (2013.01)

(58) Field of Classification Search
CPC ............... G01C 22/006; A61B 5/7235
USPC ............. 702/74, 75, 78, 140, 141, 160, 175, 702/176, 177; 600/301, 595
See application file for complete search history.

(56) References Cited

U.S. PATENT DOCUMENTS

| 2013/0085700 A1* | 4/2013 | Modi | G01C 22/006 702/104 |
| 2013/0085711 A1* | 4/2013 | Modi | G01C 22/006 702/141 |

\* cited by examiner

*Primary Examiner* — John H Le
(74) *Attorney, Agent, or Firm* — Fish & Richardson P.C.

(57) ABSTRACT

In some implementations, a mobile device can receive a motion signal from a motion sensor on the mobile device. The mobile device can determine a step count based on the motion signal. The mobile device can transform the motion signal from a time domain signal into a frequency domain signal. The mobile device can determine a dominant peak and harmonic peaks of the motion signal within a pedestrian frequency band. The mobile device can determine that the dominant peak corresponds to an arm swing of a user and adjust the step count to compensate for the arm swing.

18 Claims, 10 Drawing Sheets

ADJUSTING STEP COUNT TO COMPENSATE FOR ARM SWING

TECHNICAL FIELD

The disclosure generally relates to techniques for estimating step count by a mobile device.

BACKGROUND

Mobile devices often include motion sensors to detect when and how a mobile device is in moving. For example, the mobile device can include an accelerometer that measures movement and generates motion signals describing the movement of the mobile device. A mobile device with a motion sensor can be configured with pedometer functionality (e.g., step counting) that analyzes the motion signals generated by the mobile device's motion sensors to determine when a user has taken a step.

SUMMARY

In some implementations, a mobile device can receive a motion signal from a motion sensor on the mobile device. The mobile device can determine a step count based on the motion signal. The mobile device can transform the motion signal from a time domain signal into a frequency domain signal. The mobile device can determine a dominant peak and harmonic peaks of the motion signal within a pedestrian frequency band. The mobile device can determine that the dominant peak corresponds to an arm swing of a user and adjust the step count to compensate for the arm swing.

Particular implementations provide at least the following advantages: The step count determined by a mobile device can be corrected to compensate for the arm swing of a user when the mobile device is worn on the user's arm.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
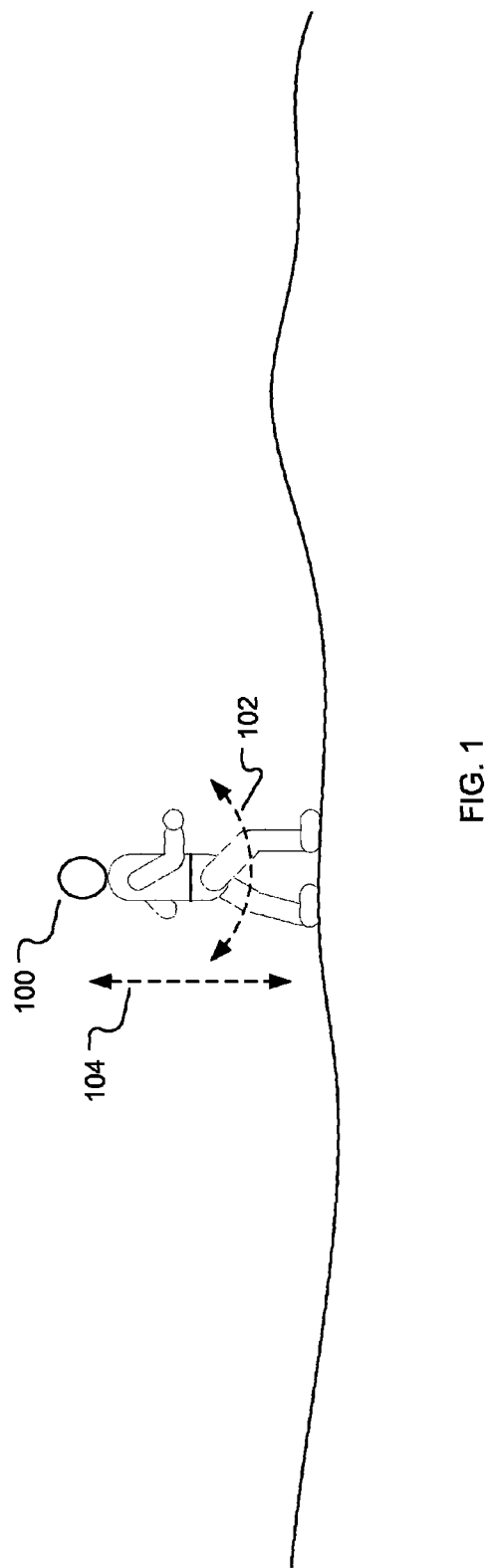
FIG. 1 illustrates an example of a user utilizing a step counting function of a mobile device.

FIG. 1 illustrates an example of a user 100 utilizing a step counting function of a mobile device. For example, user 100 can be holding or wearing a mobile device that is configured with a step counting function (e.g., a pedometer). The step counting function can receive signals from a motion sensor of the mobile device and determine when user 100 takes a step based on the motion signals received from the motion sensor. In some implementations, the mobile device can use threshold crossing algorithms to analyze the motion signal in the time domain to determine when the user takes a step. For example, every time the motion signal crosses a threshold magnitude (e.g., amplitude, power, etc.) value, the mobile device can determine that the user has taken a step and increment a step count.

In some implementations, the mobile device can perform a frequency analysis to determine a step count. For example, the mobile device can perform a Fast Fourier transformation (FFT) on the motion signal to transform the motion signal from a time domain signal to a frequency domain signal. The frequency domain signal can be analyzed by the mobile device to determine frequency having the dominant peak (e.g., peak associated with largest magnitude). The dominant frequency can be used to determine the number of steps taken by the user. For example, if the dominant frequency is two hertz (2 Hz), then the mobile device can count two steps per second.

The above mentioned methods of step detection work well when the mobile device is attached to the user's torso (e.g., waist, pockets, etc.) because the dominant forces detected by the motion sensor and used to determine a step will correspond to the up and down movement 104 generated when the user takes a step. However, when the mobile device is attached to the user's arm, wrist, or held in the user's hand, the dominant forces detected by the motion sensor can correspond to the arm swing 102. Thus, the force of the arm swing can interfere with the correct identification of a step taken by the user. For example, the force of the arm swing can mix with the force of the user's step to generate a motion signal in the time domain that makes the threshold crossing step detection algorithm inaccurate (e.g., prevents crossing the threshold). The force of the arm swing can make the arm swing the dominant frequency causing the frequency based step detection to produce inaccurate results.

Figure 2:
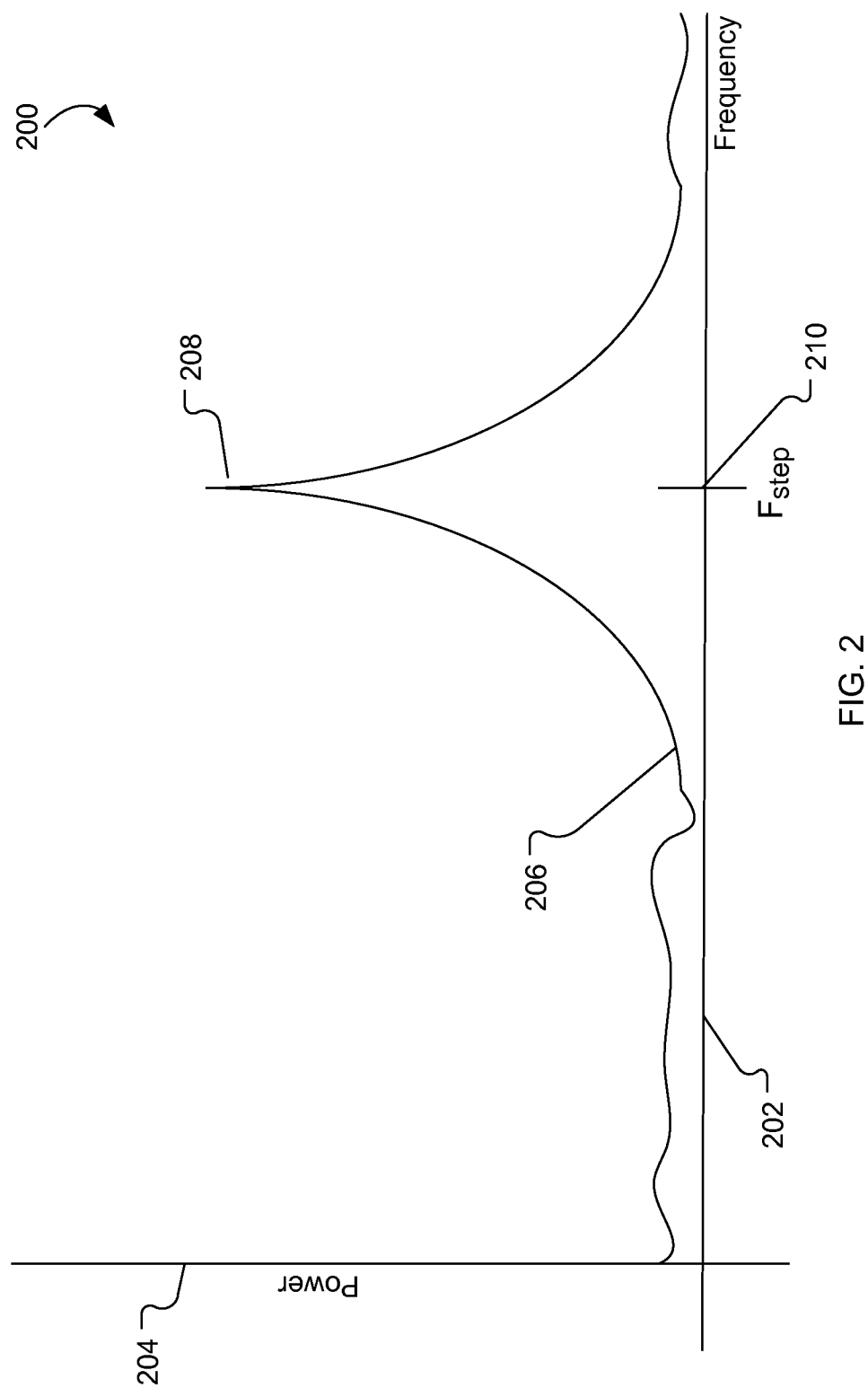
FIG. 2 illustrates an example graph of a frequency domain motion signal generated when the mobile device is worn on the torso of a user.

FIG. 2 illustrates an example graph 200 of a frequency domain motion signal generated when the mobile device is worn on the torso of a user. For example, graph 200 can be generated when a time domain motion signal (e.g., power over time) received from a motion sensor is transformed (e.g., using a FFT) into a frequency domain motion signal. Graph 200 can have a horizontal axis 202 indicating a range of frequencies and a vertical axis 204 indicating a range of power (e.g., amplitude, magnitude, force, etc.). Graph 200 can include line 206 that indicates the power detected by the motion sensor at each frequency.

In some implementations, the step frequency 208 can be determined by looking for the dominant frequency within the pedestrian frequency band. For example, the pedestrian frequency band is a range of frequencies corresponding to the pace at which people normally walk. The pedestrian frequency band (e.g., 0.4 Hz to 6 Hz) can be determined empirically. The dominant frequency is the frequency within the pedestrian frequency band that has the highest power. The term "dominant peak" refers to the power of the dominant frequency and the shape of the frequency domain waveform at the dominant frequency. For example, peak 208 corresponds to the highest power measurement in graph 200 and is, therefore, the dominant peak. Thus, because frequency 210 corresponds to dominant peak 208, frequency 210 is the dominant frequency in the graph and corresponds to the frequency at which a user takes a step. In some implementations, step counts can be generated at the same frequency as the dominant frequency. For example, if the dominant frequency is 2 Hz, then two steps will be counted for every second that passes.

Figure 3:
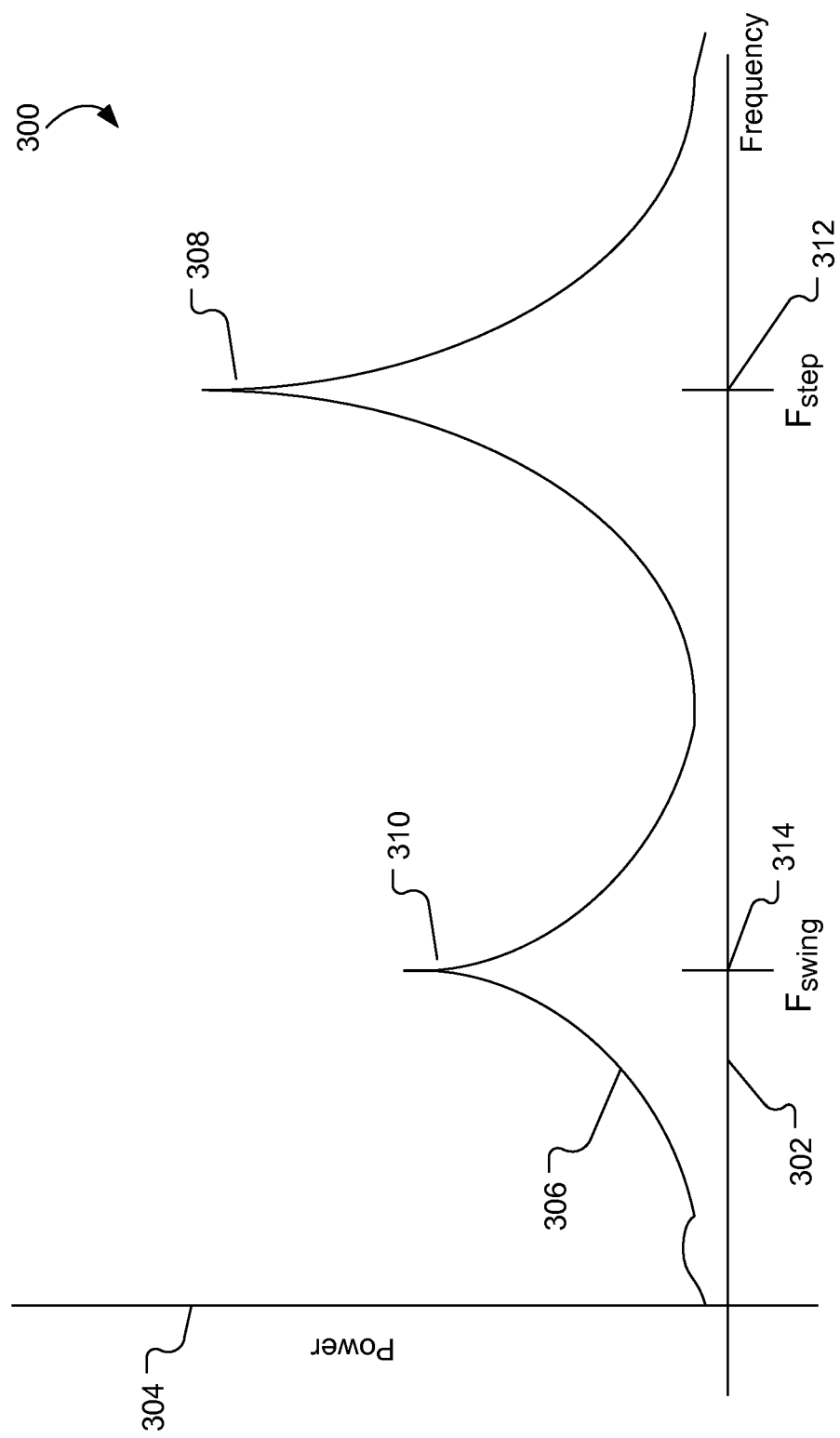
FIG. 3 illustrates an example graph of a frequency domain motion signal generated when the mobile device is worn on the arm of a user with a weak arm swing.

FIG. 3 illustrates an example graph 300 of a frequency domain motion signal generated when the mobile device is worn on the arm of a user with a weak arm swing. Graph 300 can be generated when a time domain motion signal (e.g., power over time) received from a motion sensor (e.g., accelerometer) is transformed (e.g., using a FFT) into a frequency domain motion signal. Graph 300 can have a horizontal axis 302 indicating a range of frequencies and a vertical axis 304 indicating a range of power (e.g., amplitude, magnitude, etc.). Graph 300 can include line 306 that indicates the power detected by the motion sensor at each frequency.

In some implementations, graph 300 can have peaks 308 and 310 that correspond to the motion generated when the user takes a step 308 and when the user swings her arms 310. For example, peaks and corresponding frequencies that exceed a peak quality threshold can be analyzed when determining arm swing compensation. Determining peak quality is described below with reference to FIG. 7.

As illustrated by graph 300, the dominant peak 308 corresponds to step frequency 312. The mobile device can determine that dominant peak 308 corresponds to the step frequency 312 because the dominant peak 308 is not the lowest frequency peak 310 within the pedestrian frequency band above the peak quality threshold. In graph 300, the lowest frequency peak 310 corresponds to the user's arm swing, which, in this case, is less powerful than the power generated by the user's steps. Thus, because the dominant frequency 312 corresponds to the frequency of the user's steps, no step correction is required to compensate for the user's arm swing. For example, when the user wears the mobile device on her arm, the motion of the arm can be detected by the motion sensor and can result in the generation of motion data that can make it difficult to determine a correct step count. When the power of the user's arm swing is less than the power of the user's step, no step count correction is needed, as illustrated by FIG. 3 above. When the power of the user's arm swing is greater than the power of the user's step, the arm swing frequency becomes the dominant frequency and step count correction is required, as described further below.

Figure 4:
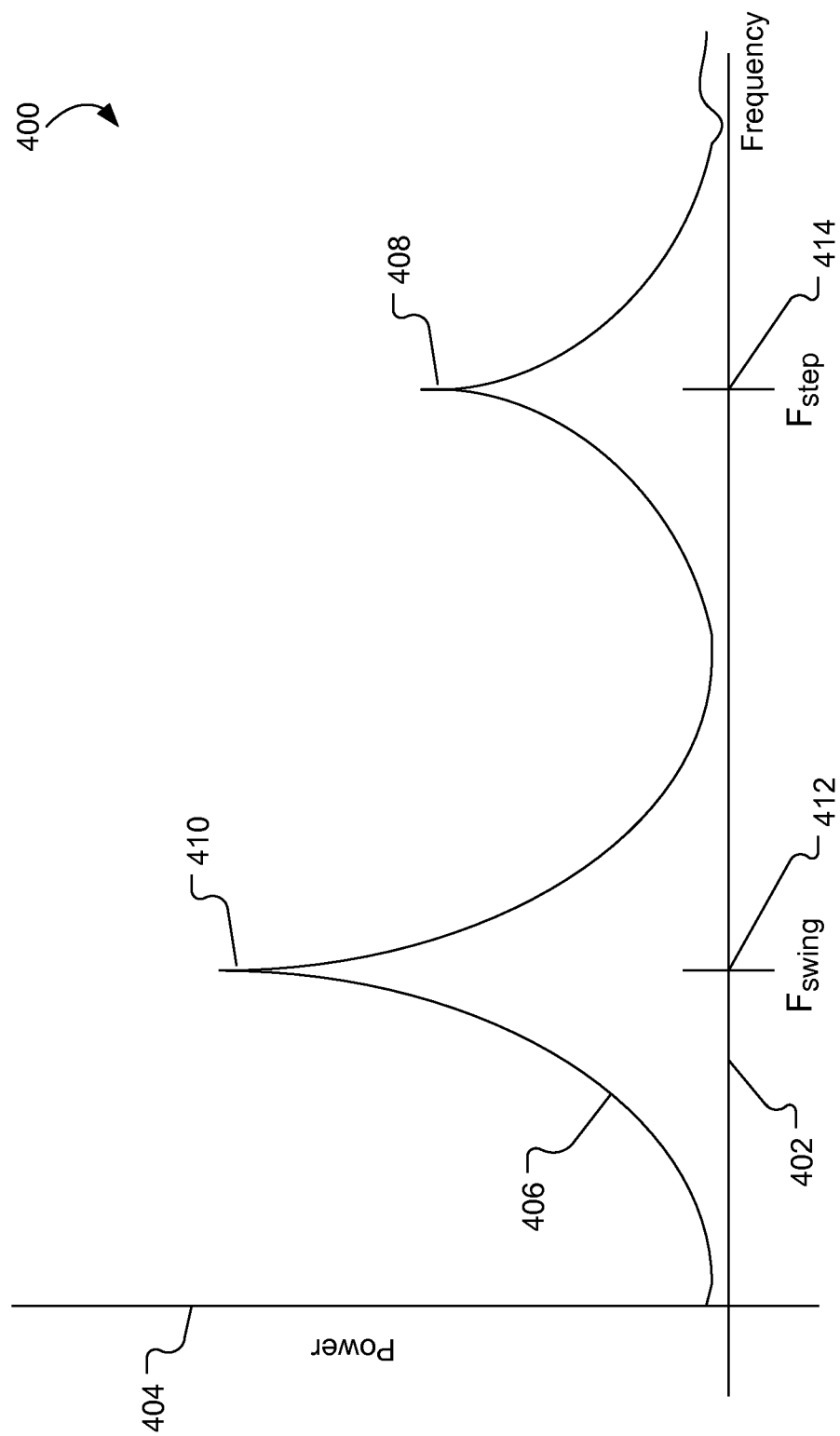
FIG. 4 illustrates an example graph of a frequency domain motion signal generated when the mobile device is worn on the arm of a user with a strong arm swing.

FIG. 4 illustrates an example graph 400 of a frequency domain motion signal generated when the mobile device is worn on the arm of a user with a strong arm swing. Similarly to graph 200, graph 400 has frequency axis 402 and power axis 404. Graph 400 can be generated when a time domain motion signal (e.g., acceleration) received from a motion sensor (e.g., accelerometer) is transformed (e.g., using a FFT) into a frequency domain motion signal. Graph 400 can have a horizontal axis 402 indicating a range of frequencies and a vertical axis 404 indicating a range of power (e.g., amplitude, magnitude, etc.). Graph 400 can include line 406 that indicates the power detected by the motion sensor at each frequency.

In some implementations, the need for arm swing compensation can be determined by analyzing the frequency domain motion signal to determine frequencies having peaks that exceed a peak quality threshold, to determine the dominant frequency, to determine that harmonics of the dominant frequency exist, to determine that the dominant frequency corresponds to the peak having the smallest frequency of all peaks above a peak quality threshold, and that there is another peak at about twice the dominant frequency.

For example, graph 400 can have peaks 408 and 410 that correspond to the motion generated when the user takes a step and when the user swings her arms. For example, peaks 408 and 410 can be located at frequencies within the pedestrian frequency band (e.g., 0.2 Hz to 6 Hz). As illustrated by graph 400, the dominant peak 410 corresponds to arm swing frequency 412, which, in this case, is more powerful than the power 408 generated by the user's steps. The mobile device can determine that dominant peak 410 corresponds to the arm swing frequency 412 if the dominant peak 410 corresponds to the lowest frequency peak 410 within the pedestrian frequency band (e.g., 0.2 Hz to 6 Hz) that exceeds a peak quality threshold value and if there is another peak at a harmonic frequency that is about two times the frequency of the dominant frequency. For example, if step frequency 414 is about twice (e.g., multiplied by about two) the arm swing frequency 412, the mobile device can determine that the dominant frequency 412 corresponds to the user's arm swing. Thus, because the dominant peak 410 corresponds to the arm swing frequency 412 instead of the step frequency 414, step correction is required.

For example, when the user wears the mobile device on her arm, the motion of the arm can be detected by the motion sensor, which generates motion data that can make it difficult to determine a correct step count, as described above. When the power of the user's arm swing is less than the power of the user's step, step count correction is needed because the dominant frequency can no longer be counted on to provide an accurate step count. When the power of the user's arm swing is greater than the power of the user's step, the arm swing frequency becomes the dominant frequency. When the dominant frequency corresponds to the user's arm swing, the step count will be about half of what it should be (e.g., frequency of the user's arm swing is about half of the frequency of the user's steps) and step count correction is required.

Figure 5:
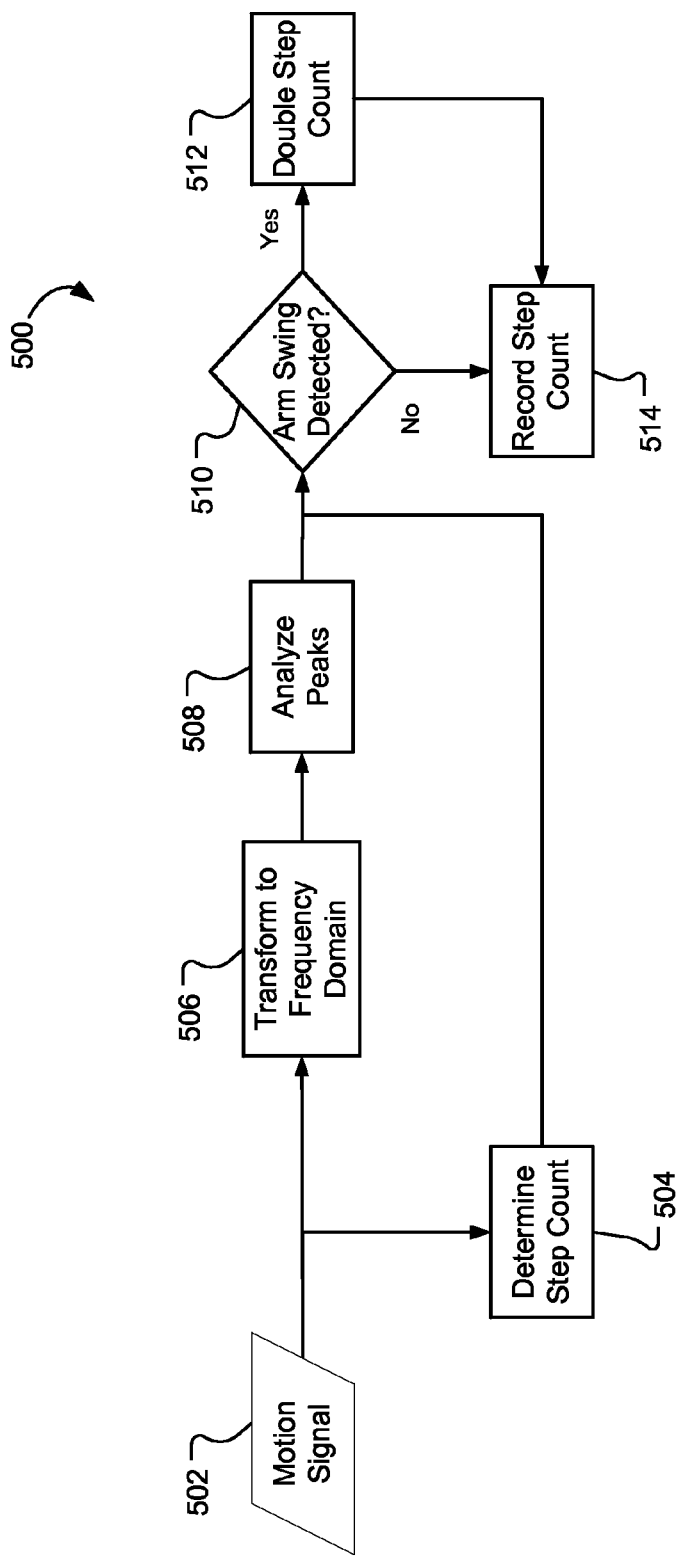
FIG. 5 illustrates an example process for adjusting a step count to compensate for a user's arm swing.

FIG. 5 illustrates an example process 500 for adjusting a step count to compensate for a user's arm swing. At step 502, the mobile device can obtain a motion signal from a motion sensor configured on the mobile device. For example, the mobile device can be configured with an accelerometer that can detect and measure the acceleration of the mobile device.

At step 504, the mobile device can determine a step count based on the motion signal. For example, the mobile device can use threshold crossing or frequency analysis algorithms, as described above, to determine a preliminary step count based on the motion signal.

At step 506, the mobile device can transform the motion signal from a time domain motion signal into a frequency domain motion signal. For example, the mobile device can perform a FFT on the time domain motion signal to generate a frequency domain motion signal, as described above with reference to FIGS. 2-4.

At step 506, the mobile device can analyze the peaks of the frequency domain motion signal to determine whether to adjust the preliminary step count. For example, the mobile device can identify the dominant frequency within the pedestrian frequency band by determining which frequency has the tallest peak. If the dominant frequency corresponds to the smallest frequency peak within the pedestrian frequency band and there is a peak at a frequency that is a multiple of (e.g., about two times) the dominant frequency, then the mobile device can determine that the dominant frequency corresponds to the arm swing of the user.

At step 508, if the mobile device determines that the dominant frequency corresponds to the user's arm swing, then at step 512 the mobile device can multiply the preliminary step count by a factor (e.g., about two) to obtain the corrected step count and record the corrected step count at step 514. If, at step 508, the mobile device determines that the dominant frequency does not correspond to the user's arm swing (e.g., the left most frequency is not the dominant frequency or there is no peak at twice the dominant frequency), the mobile device can record the preliminary step count at step 514. For example, the mobile device can record the step count at step 514 by saving the step count to memory, adding the step count to a previously determined step count, and/or presenting the step count to the user.

In some implementations, the mobile device can determine the step count, as described above, for discrete, sequential windows of time and then add the step count determined for a time window to step counts determined for previous windows of time. For example, samples of the motion signal can be obtained at step 502 using a first window of five seconds. The five second of samples can be analyzed as described in process 500 to determine a step count. After the first window of samples is analyzed, samples of motion signal can be obtained at step 502 using a second window of five seconds, analyzed and a step count determined. The step count determined for the second window of samples can be added to the step count of the first window of samples to get a total step count across the two windows of samples. This process can continue until the user stops taking steps or until the step counting feature of the mobile device is disabled, for example.

Figure 6:
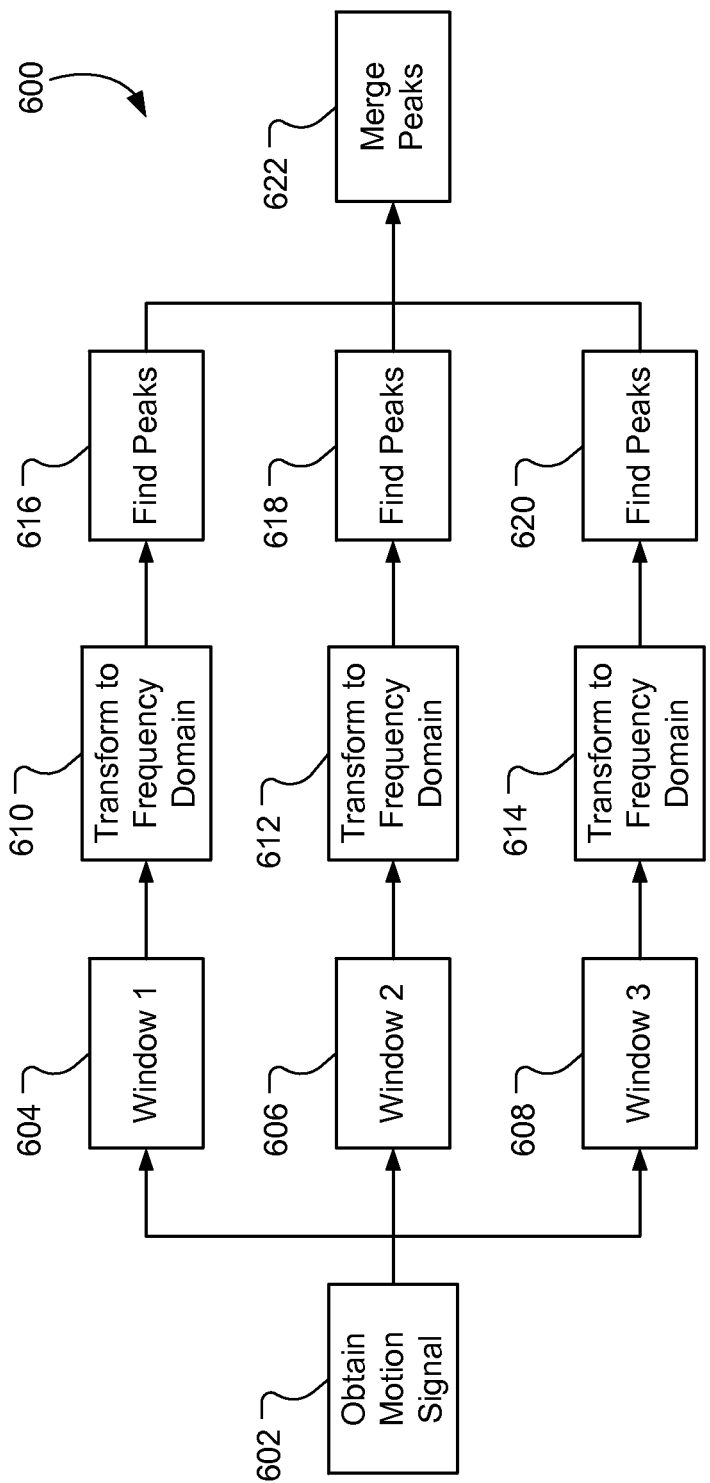
FIG. 6 illustrates an example process for generating a composite frequency domain motion signal having "best quality" peaks.
Figure 7:
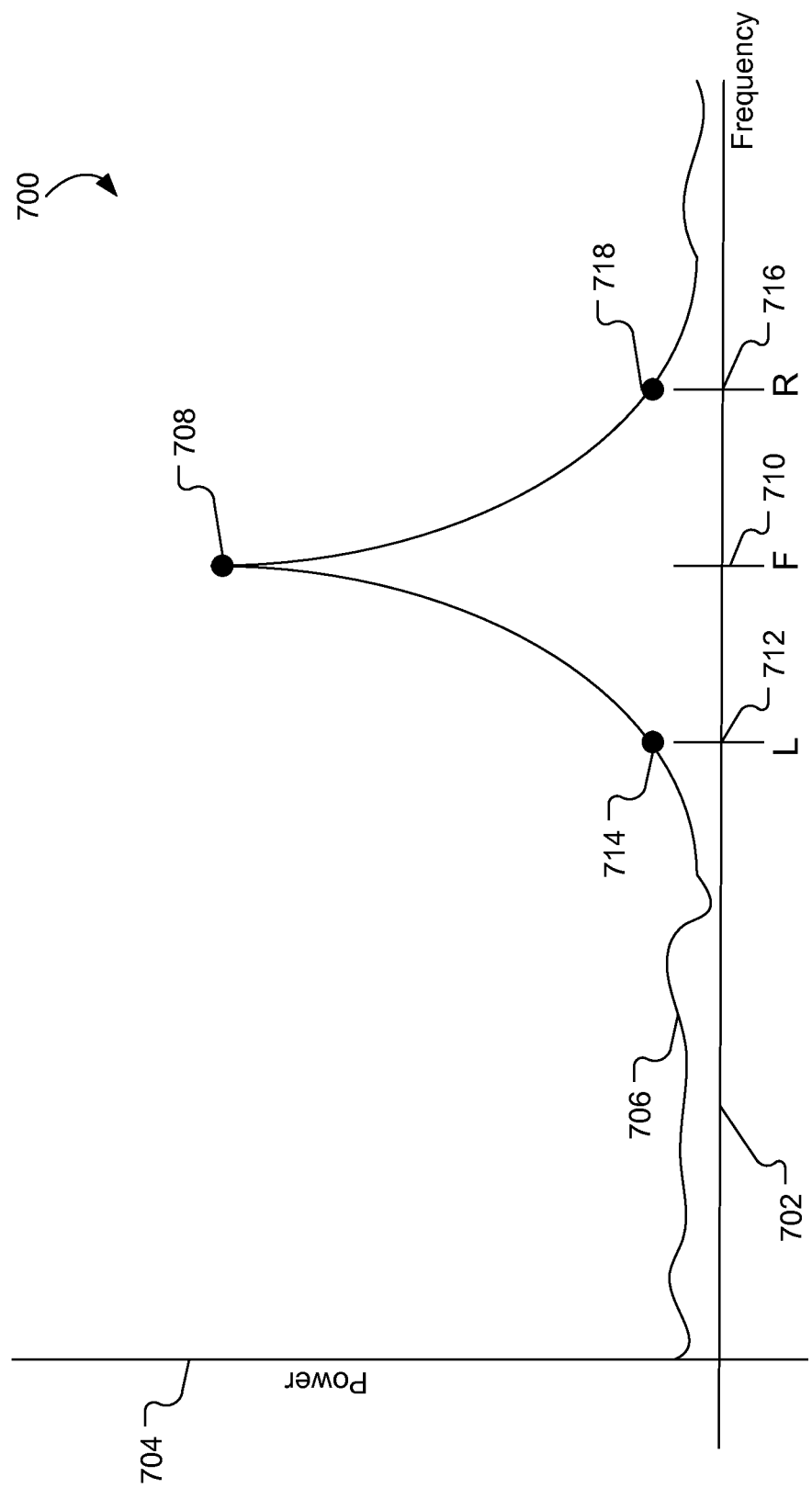
FIG. 7 illustrates an example graph demonstrating a "peak quality" calculation.

FIG. 6 illustrates an example process 600 for generating a composite frequency domain motion signal having "best quality" peaks, as described in reference to FIG. 7. For example, process 600 can be performed as part of step 506 of FIG. 5. In some implementations, the processes for determining that the step count should be corrected for arm swing, as described above, can be performed by analyzing windows of motion data. For example, the motion signal received from the motion sensor can be analyzed in discrete windows of time (e.g., 5 second windows, 10 second windows, etc.). The window size can have an effect on the quality of peaks observed when the time domain motion signal is transformed to a frequency domain motion signal. Thus, in some implementations, the motion signal can be analyzed using various windows of time to generate the best peaks for performing the arm swing step count correction processes described above.

At step 602, a motion signal can be obtained. For example, the motion signal can be obtained from a motion sensor of the mobile device. The motion signal can be a time domain motion signal that indicates the magnitude of motion over time.

At step 604, the mobile device can obtain a first sample of the motion signal for first period of time using a first window function (e.g., a 3 second window). At step 606, the mobile device can obtain a second sample of the motion signal for a second period of time using a second window function (e.g., a five second window). At step 608, the mobile device can obtain a third sample of the motion signal for a third period of time using a third window function (e.g., a 10 second window). The window functions can be applied to the motion signal concurrently or sequentially in time or can be overlapping in time to obtain samples of the motion signal to analyze when generating a composite frequency domain motion signal with the best peaks.

At steps 610-614, the mobile device can transform the time domain motion signal samples for each window of time into the frequency domain. For example, the mobile device can perform an FFT or other frequency transform on the motion signal sample for each window of time.

At steps 616-620, the mobile device can identify the best quality peaks in the frequency domain motion sample for each window of time. For example, for some users longer sample windows will generate better quality peaks. For other users, shorter sample windows will generate better quality peaks. Thus, the mobile device can be configured to analyze motion signal sample windows of varying lengths to determine the motion signal windows with the best quality peaks. This approach will capture a wider range of stride behavior. For example, longer motion signal sample windows will generate better quality peaks for a user with slow constant pacing in their movement. Shorter motion signal sample windows will generate better quality peaks for a user with irregular pacing. A method for determining the quality of frequency domain motion signal peaks is described with reference to FIG. 7, below.

At step 622, once the best quality peaks are identified in each frequency domain motion signal window, the best quality peaks for each frequency can be merged to generate a composite frequency domain signal. For example, the best quality peak for each frequency in the pedestrian frequency band can be determined from the various frequency domain motion signal sample windows. The best peaks for each frequency across the sample windows can be combined into a composite frequency domain motion signal. For example, the composite motion signal can include peaks from two or more sample windows. The best peak for one frequency can come from a short window while the best peak for another frequency can come from a long window. The composite frequency domain motion signal can be used in step 508 of FIG. 5 to analyze the frequency domain motion signal peaks and determine if an arm swing is detected.

FIG. 7 illustrates an example graph 700 demonstrating a "peak quality" calculation. Similarly to graph 200, graph 700 has frequency axis 702 and power axis 704. Line 706 is the frequency domain motion signal. In some implementations, the quality of a peak ("quality score") for a particular frequency can be determined relative to the power measurements of the frequencies on either side of the particular frequency. For example, frequency domain motion signal 706 can include peak 708. Peak 708 corresponds to frequency 710 and indicates the power (e.g., amplitude, magnitude of motion, etc.) associated with frequency 710. On the left of frequency 710 is frequency 712 having corresponding power 714. On the right of frequency 710 is frequency 716 having corresponding power 718. In some implementations, the mobile device can calculate the quality of peak 708 by subtracting the average of powers 714, 718 at frequencies 712, 716 from the power 708 at frequency 710 and dividing the difference by the power 708 at frequency 710 given by $$Q=[P(F)-0.5(P(L)+P(R))]/P(F)).$$

Application Programming Interfaces

One or more Application Programming Interfaces (APIs) may be used in implementations described herein. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some implementations, the API-implementing component may provide more than one API, that provide access to different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other implementations, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (e.g., the API-implementing component and the API-calling component may be the same or different type of module from each other). API-implementing components may in some cases be embodied at least in part in firmware, microcode, or other hardware logic.

In some implementations, an API may allow a client program to use the services provided by a Software Development Kit (SDK) library. In other embodiments an application or other client program may use an API provided by an Application Framework. In these implementations, the application or client program may incorporate calls to functions or methods provided by the SDK and/or provided by the API or use data types or objects defined in the SDK and provided by the API. An Application Framework may in these implementations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (e.g., on the same data processing system as the API-implementing component) or a remote component (e.g., on a different data processing system from the API-implementing component) that communicates with the API-implementing component through the API over a network. An API-implementing component may also act as an API-calling component (e.g., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component, thus the API may include features for translating calls and returns between the API-implementing component and the API-calling component. However the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of *APIs*.

Figure 8:
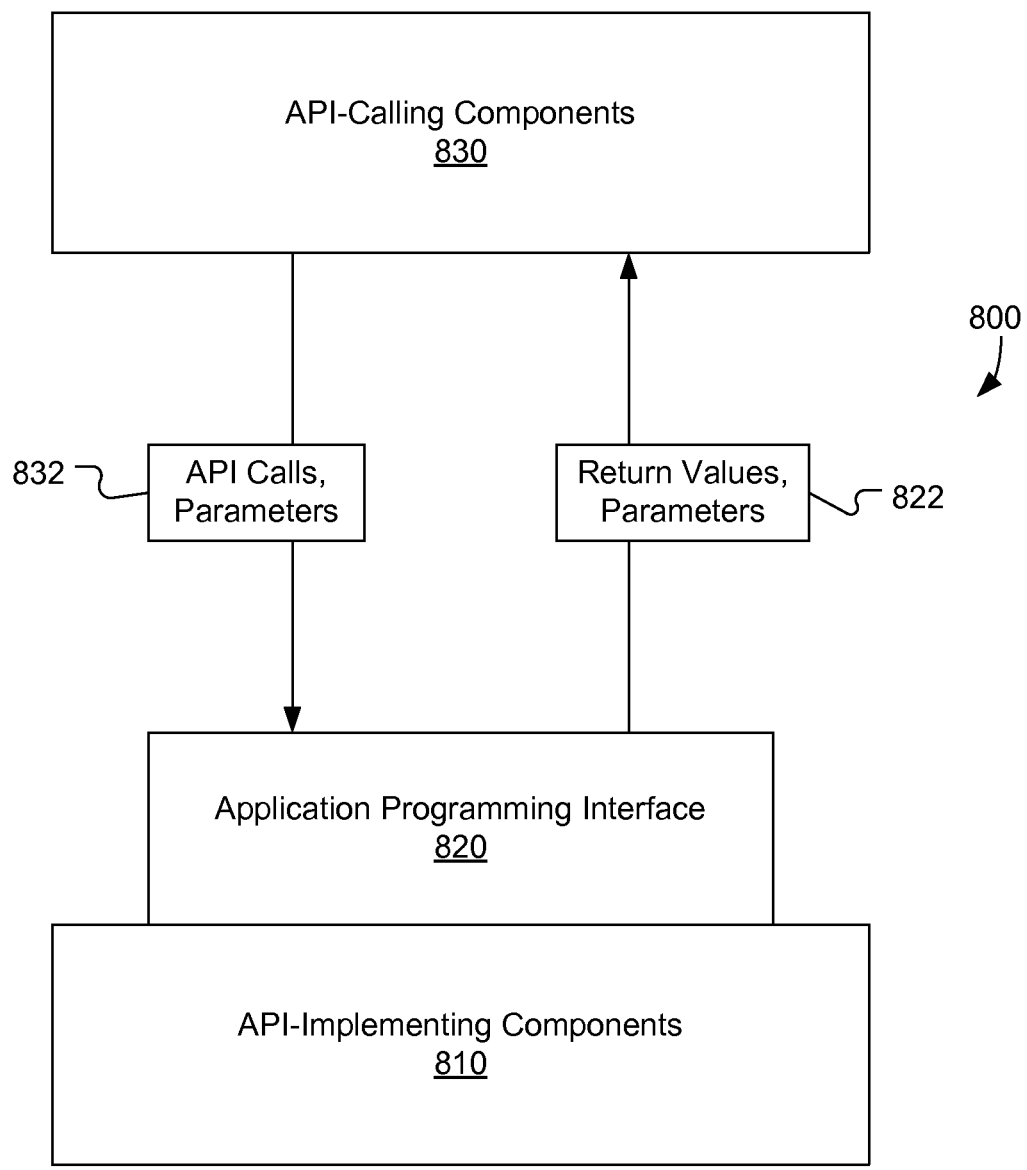
FIG. 8 is a block diagram illustrating an example API architecture, which can be used in some implementations.

FIG. 8 is a block diagram illustrating an example API architecture 800, which can be used in some implementations. As shown in FIG. 8, the API architecture 800 includes the API-implementing component 810 (e.g., an operating system, a library, a device driver, an API, an application program, software or other module) that implements the API 820. The API 820 can specifiy one or more functions, methods, classes, objects, protocols, data structures, formats and/or other features of the API-implementing component that may be used by the API-calling component 830. The API 820 can specify at least one calling convention that specifies how a function in the API-implementing component receives parameters 832 from the API-calling component and how the function returns a result 822 to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

For example, the API-implementing component 810 can include additional functions, methods, classes, data structures, and/or other features that are not specified through the API 820 and are not available to the API-calling component 830. The API-calling component 830 may be on the same system as the API-implementing component 810 or may be located remotely and accesses the API-implementing component 810 using the API 820 over a network. While FIG. 8 illustrates a single API-calling component 830 interacting with the API 820, other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 9:
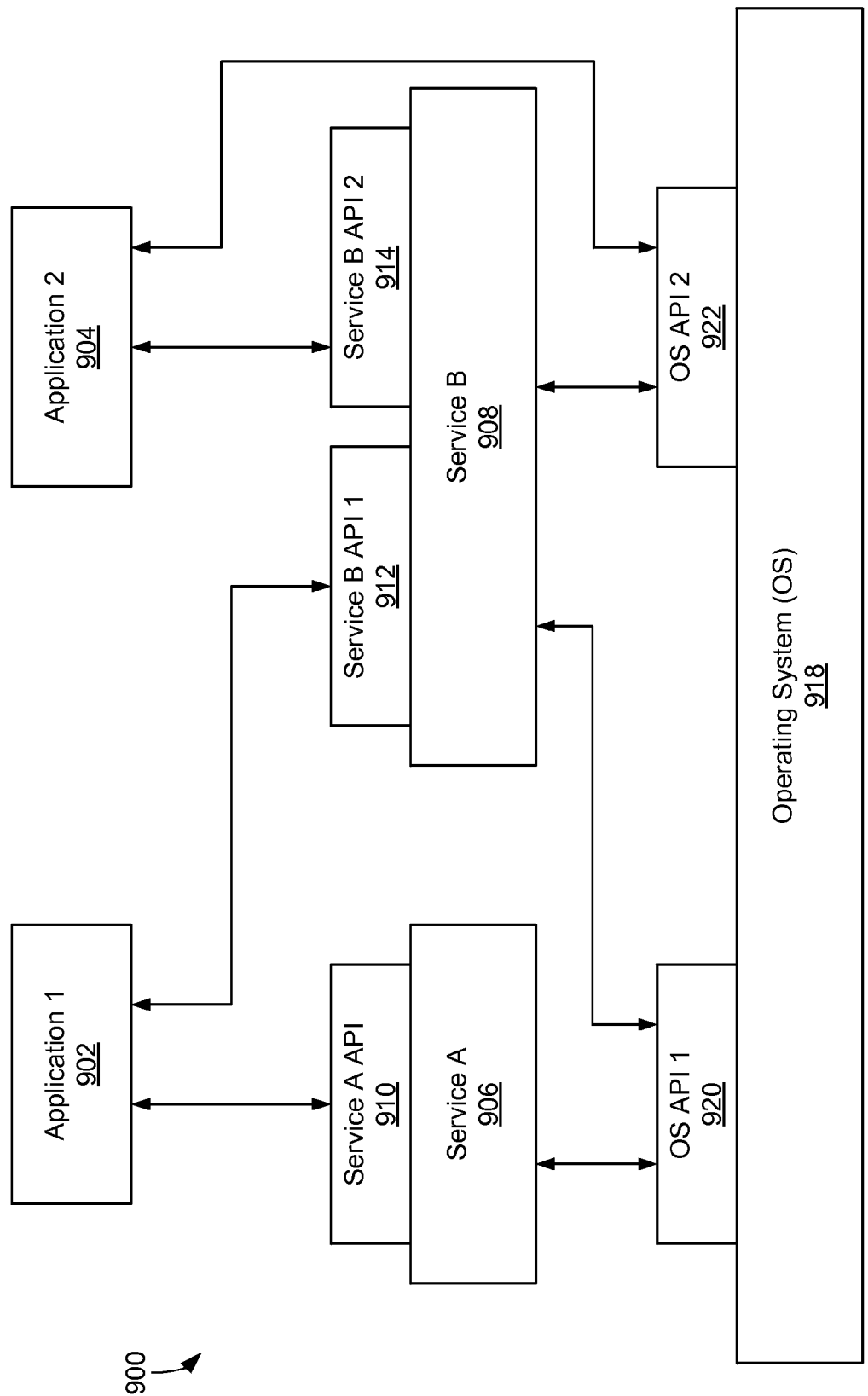
FIG. 9 illustrates an example software stack that includes various application programming interfaces.

FIG. 9 illustrates an example software stack 900 that includes various application programming interfaces. As illustrated by FIG. 9, applications 902 and 904 can make calls to Service A 906 or Service B 908 using several Service APIs 910-916 and to Operating System (OS) 918 using several OS APIs 920-922. Service A 906 or Service B 908 can make calls to OS using several OS APIs 920-922.

Note that the Service B 908 has two APIs 912 and 914, one of which, Service B API 1 912, receives calls from and returns values to Application 1 902 and the other, Service B API 2 914, receives calls from and returns values to Application 2 904. Service A 906 (which can be, for example, a software library) makes calls to and receives returned values from OS API 1 920, and Service B 922 (which can be, for example, a software library) makes calls to and receives returned values from both OS API 1 920 and OS API 2 922. Application 2 904 makes calls to and receives returned values from OS API 2 922.

Example System Architecture

Figure 10:
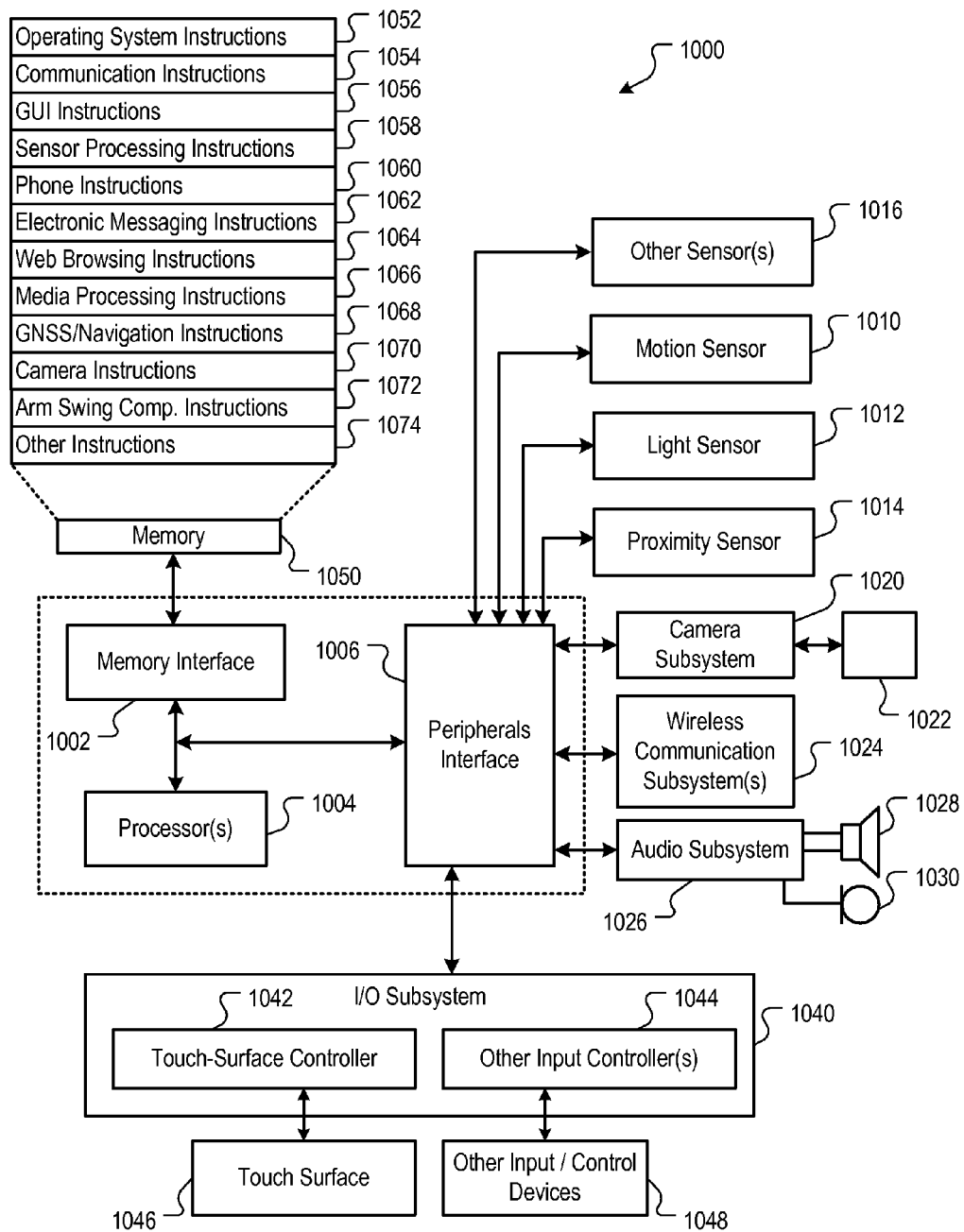
FIG. 10 is a block diagram of an example computing device that can implement the features and processes of FIGS. 1-9.

FIG. 10 is a block diagram of an example computing device 1000 that can implement the features and processes of FIGS. 1-9. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 1000 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™. The computing device 1000 can, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for adjusting a step count to compensate for the user's arm swing. For example, operating system 1052 can implement the arm swing compensation features as described with reference to FIGS. 1-9.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions. The memory 1050 can store other software instructions 1072 to facilitate other processes and functions, such as the arm swing compensation processes and functions as described with reference to FIGS. 1-9.

The memory 1050 can also store other software instructions 1084, such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

What is claimed is:

1. A method comprising:

obtaining, by a mobile device, a first step count for a user of the mobile device based on a motion sensor signal provided by a motion sensor of the mobile device;

generating a frequency domain motion signal based on the motion sensor signal;

analyzing peaks of the frequency domain motion signal within a pedestrian frequency band to identify a dominant frequency of the motion sensor signal, the analyzing including determining that the dominant frequency corresponds to a lowest frequency peak within the pedestrian frequency band and has a peak that exceeds a threshold value, and determining that another peak within the pedestrian frequency band corresponds to a harmonic frequency that is a multiple of the dominant frequency;

detecting that the user is wearing the mobile device on the user's arm based on the analysis; and in response to the detecting, multiplying the first step count by a factor to calculate an adjusted step count, where the method is performed by one or more hardware processors.

2. The method of claim 1, wherein the adjusted step count is about twice the first step count.

3. The method of claim 1, wherein the threshold value is based on power measurements at frequencies in the pedestrian frequency band that are above and below the dominant frequency.

4. The method of claim 3, wherein the threshold value is determined by subtracting an average of the power measurements from a power measurement at the dominant frequency.

5. The method of claim 1, wherein generating the frequency domain motion signal comprises:

sampling the motion sensor data using a plurality of sample windows associated with different time periods;

identifying, based on a quality score, a quality peak for each frequency within a pedestrian frequency band across the plurality of sample windows; and combining two or more quality peaks having the highest quality scores to generate a composite frequency domain motion signal.

6. The method of claim 5, wherein identifying, based on a quality score, a quality peak for each frequency within a pedestrian frequency band across the plurality of sample windows, further comprises:

generating a first quality score for each of plurality of first peaks of a first frequency domain motion signal sample associated with a first time window;

generating a second quality score for each of a plurality of second peaks of a second frequency domain motion signal sample associated with a second time window;

comparing each of the first quality scores to a corresponding one of the second quality scores to identify the highest quality scores, where each of the first and second quality scores are associated with a frequency.

7. A non-transitory computer-readable medium including one or more sequences of instructions which, when executed by one or more processors, causes:
- obtaining, by a mobile device, a first step count for a user of the mobile device based on a motion sensor signal provided by a motion sensor of the mobile device;
- generating a frequency domain motion signal based on the motion sensor signal;
- analyzing peaks of the frequency domain motion signal within a pedestrian frequency band to identify a dominant frequency of the motion sensor signal, the analyzing including determining that the dominant frequency corresponds to a lowest frequency peak within the pedestrian frequency band and has a peak that exceeds a threshold value, and determining that another peak within the pedestrian frequency band corresponds to a harmonic frequency that is a multiple of the dominant frequency;
- detecting that the user is wearing the mobile device on the user's arm based on the analysis; and
in response to the detecting, multiplying the first step count by a factor to calculate an adjusted step count.

8. The non-transitory computer-readable medium of claim 7, wherein the adjusted step count is about twice the first step count.

9. The non-transitory computer-readable medium of claim 7, wherein the threshold value is based on power measurements at frequencies in the pedestrian frequency band that are above and below the dominant frequency.

10. The non-transitory computer-readable medium of claim 9, wherein the threshold value is determined by subtracting an average of the power measurements from a power measurement at the dominant frequency.

11. The non-transitory computer-readable medium of claim 7, wherein the instructions that cause generating the frequency domain motion signal comprise instructions that cause:
- sampling the motion sensor data using a plurality of sample windows associated with different time periods;
- identifying, based on a quality score, a quality peak for each frequency within a pedestrian frequency band across the plurality of sample windows; and
- combining two or more quality peaks having the highest quality scores to generate a composite frequency domain motion signal.

12. The non-transitory computer-readable medium of claim 11, wherein the instructions cause:
- generating a first quality score for each of plurality of first peaks of a first frequency domain motion signal sample associated with a first time window;
- generating a second quality score for each of a plurality of second peaks of a second frequency domain motion signal sample associated with a second time window;
- comparing each of the first quality scores to a corresponding one of the second quality scores to identify the highest quality scores, where each of the first and second quality scores are associated with a frequency.

13. A mobile device comprising:
a motion sensor;
one or more processors; and
a non-transitory computer-readable medium including one or more sequences of instructions which, when executed by one or more processors, causes:
- obtaining, by the mobile device, a first step count for a user of the mobile device based on a motion sensor signal provided by the motion sensor of the mobile device;
- generating a frequency domain motion signal based on the motion sensor signal;
- analyzing peaks of the frequency domain motion signal within a pedestrian frequency band to identify a dominant frequency of the motion sensor signal, the analyzing including determining that the dominant frequency corresponds to a lowest frequency peak within the pedestrian frequency band and has a peak that exceeds a threshold value, and determining that another peak within the pedestrian frequency band corresponds to a harmonic frequency that is a multiple of the dominant frequency;
- detecting that the user is wearing the mobile device on the user's arm based on the analysis; and
- in response to the detecting, multiplying the first step count by a factor to calculate an adjusted step count.

14. The mobile device of claim 13, wherein the adjusted step count is about twice the first step count.

15. The mobile device of claim 13, wherein the threshold value is based on power measurements at frequencies in the pedestrian frequency band that are above and below the dominant frequency.

16. The mobile device of claim 15, wherein the threshold value is determined by subtracting an average of the power measurements from a power measurement at the dominant frequency.

17. The mobile device of claim 13, wherein the instructions that cause generating the frequency domain motion signal comprise instructions that cause:
- sampling the motion sensor data using a plurality of sample windows associated with different time periods;
- identifying, based on a quality score, a quality peak for each frequency within a pedestrian frequency band across the plurality of sample windows; and
- combining two or more quality peaks having the highest quality scores to generate a composite frequency domain motion signal.

18. The mobile device of claim 17, wherein the instructions cause:
- generating a first quality score for each of plurality of first peaks of a first frequency domain motion signal sample associated with a first time window;
- generating a second quality score for each of a plurality of second peaks of a second frequency domain motion signal sample associated with a second time window;
- comparing each of the first quality scores to a corresponding one of the second quality scores to identify the highest quality scores, where each of the first and second quality scores are associated with a frequency.

* * * * *